(12) United States Patent
Goodrich

(10) Patent No.: US 7,578,467 B2
(45) Date of Patent: Aug. 25, 2009

(54) METHODS AND APPARATUSES FOR INDICATING AND/OR ADJUSTING TENSION IN PLIANT TENSION MEMBERS, INCLUDING AIRCRAFT RECOVERY LINES

(75) Inventor: Wayne Goodrich, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 209 days.

(21) Appl. No.: 11/590,223

(22) Filed: Oct. 30, 2006

(65) Prior Publication Data
US 2008/0099604 A1 May 1, 2008

(51) Int. Cl.
B64F 1/02 (2006.01)
G01L 5/04 (2006.01)

(52) U.S. Cl. .............................. 244/110 C; 73/862.392

(58) Field of Classification Search ............. 244/110 C, 244/110 F, 110 R, 116; 73/862.392, 862.393, 73/862.56, 862.57; 294/132, 82.14; 43/16, 43/17; 248/217.1, 648; 24/71.1, 71 R
See application file for complete search history.

(56) References Cited

U.S. PATENT DOCUMENTS

| | | | |
|---|---|---|---|
| 965,881 | A | 8/1910 | Draper |
| 968,339 | A | 8/1910 | Geraldson |
| 1,144,505 | A | 6/1915 | Steffan |
| 1,383,595 | A | 7/1921 | Black |
| 1,428,163 | A | 9/1922 | Harriss |
| 1,499,472 | A | 7/1924 | Hazen |
| 1,556,348 | A | 10/1925 | Ray et al. |
| 1,624,188 | A | 4/1927 | Simon |
| 1,634,964 | A | 7/1927 | Steinmetz |
| 1,680,473 | A | 8/1928 | Parker |
| 1,686,298 | A | 10/1928 | Uhl |
| 1,716,670 | A | 6/1929 | Sperry |
| 1,731,091 | A | 10/1929 | Belleville |
| 1,737,483 | A | 11/1929 | Verret |
| 1,748,663 | A | 2/1930 | Tucker |

(Continued)

FOREIGN PATENT DOCUMENTS

DE    4301671 A1    7/1993

(Continued)

OTHER PUBLICATIONS

"Ames Builds Advanced Yawed-Wing RPV," Aviation Week and Space Technology, Jan. 22, 1973, p. 73.

(Continued)

*Primary Examiner*—Michael R Mansen
*Assistant Examiner*—Stephen Brookman
(74) *Attorney, Agent, or Firm*—Perkins Coie LLP

(57) ABSTRACT

Methods and apparatuses for measuring and adjusting tension in pliant tension members, including aircraft recovery lines. A tool for indicating tension in a pliant tension member in accordance with one embodiment of the invention, for example, can include a first support member releasably coupled to a flexible line suspended from a support structure. The first support member is positioned generally parallel to the flexible line. The tool can also include a second support member coupled to the first support member and positioned at an acute angle relative to the first support member. The second support member has a center of gravity at a selected distance from the flexible line. The second support member is generally horizontal when the tension in the flexible line is at a desired value.

30 Claims, 6 Drawing Sheets

U.S. PATENT DOCUMENTS

| | | | |
|---|---|---|---|
| 1,756,747 | A | 4/1930 | Holland |
| 1,836,010 | A | 12/1931 | Audrain |
| 1,842,432 | A | 1/1932 | Stanton |
| 1,912,723 | A | 6/1933 | Perkins |
| 1,925,212 | A | 9/1933 | Steiber |
| 1,940,030 | A | 12/1933 | Steiber |
| 2,364,527 | A | 12/1944 | Haygood |
| 2,390,754 | A | 12/1945 | Valdene |
| 2,435,197 | A | 2/1948 | Brodie |
| 2,436,240 | A | 2/1948 | Wiertz |
| 2,448,209 | A | 8/1948 | Boyer et al. |
| 2,465,936 | A | 3/1949 | Schultz |
| 2,488,050 | A | 11/1949 | Brodie |
| 2,526,348 | A | 10/1950 | Gouge |
| 2,814,453 | A | 11/1957 | Trimble et al. |
| 2,844,340 | A | 7/1958 | Daniels et al. |
| 2,919,871 | A | 1/1960 | Sorensen |
| 3,069,118 | A | 12/1962 | Bernard |
| RE25,406 | E | 6/1963 | Byrne et al. |
| 3,454,244 | A | 7/1969 | Walander |
| 3,468,500 | A | 9/1969 | Carlsson |
| 3,484,061 | A | 12/1969 | Niemkiewicz |
| 3,672,214 | A * | 6/1972 | Yasuda .................... 73/862.46 |
| 3,765,625 | A | 10/1973 | Myhr et al. |
| 3,827,660 | A | 8/1974 | Doolittle |
| 3,980,259 | A | 9/1976 | Greenhalgh et al. |
| 4,147,317 | A | 4/1979 | Mayhew et al. |
| 4,149,840 | A | 4/1979 | Tippmann |
| 4,236,686 | A | 12/1980 | Barthelme et al. |
| 4,311,290 | A | 1/1982 | Koper |
| 4,523,729 | A | 6/1985 | Frick |
| 4,566,658 | A | 1/1986 | Di Giovanniantonio et al. |
| 4,753,400 | A | 6/1988 | Reuter et al. |
| 4,790,497 | A | 12/1988 | Yoffe et al. |
| 4,809,933 | A | 3/1989 | Buzby et al. |
| 4,979,701 | A | 12/1990 | Colarik et al. |
| 5,039,034 | A | 8/1991 | Burgess et al. |
| 5,042,750 | A | 8/1991 | Winter |
| 5,054,717 | A | 10/1991 | Taylor |
| 5,109,788 | A | 5/1992 | Heinzmann |
| 5,390,550 | A * | 2/1995 | Miller ..................... 73/862.46 |
| 5,509,624 | A | 4/1996 | Takahashi |
| 5,583,311 | A | 12/1996 | Rieger |
| 5,687,930 | A | 11/1997 | Wagner et al. |
| 6,264,140 | B1 | 7/2001 | McGeer et al. |
| 7,175,135 | B2 | 6/2005 | Dennis et al. |
| 7,059,564 | B2 | 6/2006 | Dennis |
| 7,066,430 | B2 | 6/2006 | Dennis et al. |
| 7,114,680 | B2 | 10/2006 | Dennis |
| 7,121,507 | B2 | 10/2006 | Dennis et al. |
| 7,152,827 | B2 | 12/2006 | McGeer |
| 2002/0100838 | A1 | 8/2002 | McGeer et al. |
| 2003/0222173 | A1 | 12/2003 | McGeer et al. |
| 2005/0133665 | A1 | 6/2005 | Dennis et al. |

FOREIGN PATENT DOCUMENTS

| | | |
|---|---|---|
| GB | 2 080 216 A | 2/1982 |
| GB | 2 219 777 A | 12/1989 |
| IL | 76726 | 1/1991 |
| JP | 07-304498 | 11/1995 |
| WO | WO-00/75014 A1 | 12/2000 |
| WO | WO-01/07318 A1 | 2/2001 |

OTHER PUBLICATIONS

Dickard, H. E. "Mini-RPV Recovery System Conceptual Study," final report, U. S. Army Air Mobility Research and Development Laboratory, Fort Eustis, Virginia, Aug. 1977, Contract DAAJ02-76-C-0048, Report No. USAAMRDL-TR-77-24.

Robinson, Russell Norman, "Dynamic Analysis of a Carousel Remotely Piloted Vehicle Recovery System," master's thesis, Naval Post-Graduate School, Monterey, California, Dec. 1977, Thesis No. ADA052401.

* cited by examiner

METHODS AND APPARATUSES FOR INDICATING AND/OR ADJUSTING TENSION IN PLIANT TENSION MEMBERS, INCLUDING AIRCRAFT RECOVERY LINES

TECHNICAL FIELD

The present disclosure relates generally to methods and apparatuses for indicating and/or adjusting tension in pliant tension members, including aircraft recovery lines.

BACKGROUND

Unmanned aircraft or air vehicles (UAVs) provide enhanced and economical access to areas where manned flight operations are unacceptably costly and/or dangerous. For example, unmanned aircraft outfitted with remotely operated movable cameras can perform a wide variety of surveillance missions, including spotting schools of fish for the fisheries industry, monitoring weather conditions, providing border patrols for national governments, and providing military surveillance before, during, and/or after military operations.

Many unmanned aircraft systems (which can include the aircraft itself along with launch devices and recovery devices), however, can be difficult to install and operate in cramped quarters, such as the deck of a small fishing boat, land vehicle, or other craft. Accordingly, the operation of such aircraft systems often includes retrieval or capture of the aircraft with a vertically oriented recovery line when space is insufficient for a normal landing run. One concern with capturing aircraft using vertically oriented recovery lines, however, is that tension in the line must be precisely controlled to avoid damaging the aircraft and/or the support structure from which the recovery line is suspended during capture and post-capture operations. For example, if the recovery line is not tight enough, the line may not sufficiently impede the aircraft's motion after capture, which can result in the aircraft receiving a hard stop or jerk as the recovery line tightens after capture. On the other hand, if the recovery line is too tight, the aircraft can bounce off the line and not be captured at all. In either case, the aircraft and/or the support structure can be damaged.

One conventional method for measuring the tension in the recovery line is the "finger" test in which an operator feels the recovery line with his or her fingers to see if the tension "feels right." One drawback with this method is that it is completely operator-dependent, and the measurements can vary widely from person to person. Another conventional method for measuring the tension in the recovery line is to attach a "fish scale" or other type of force scale to the recovery line and pull back on the scale to measure the tension. One drawback with this approach, however, is that the readings from the scale can vary significantly depending on where on the recovery line the scale is positioned and the amount of force the operator applies when pulling back on the scale. Furthermore, measurements from the scale are often interpreted very differently by different operators, which can result in inconsistent and/or inaccurate measurements.

DETAILED DESCRIPTION

A. Overview

Figure 1A:
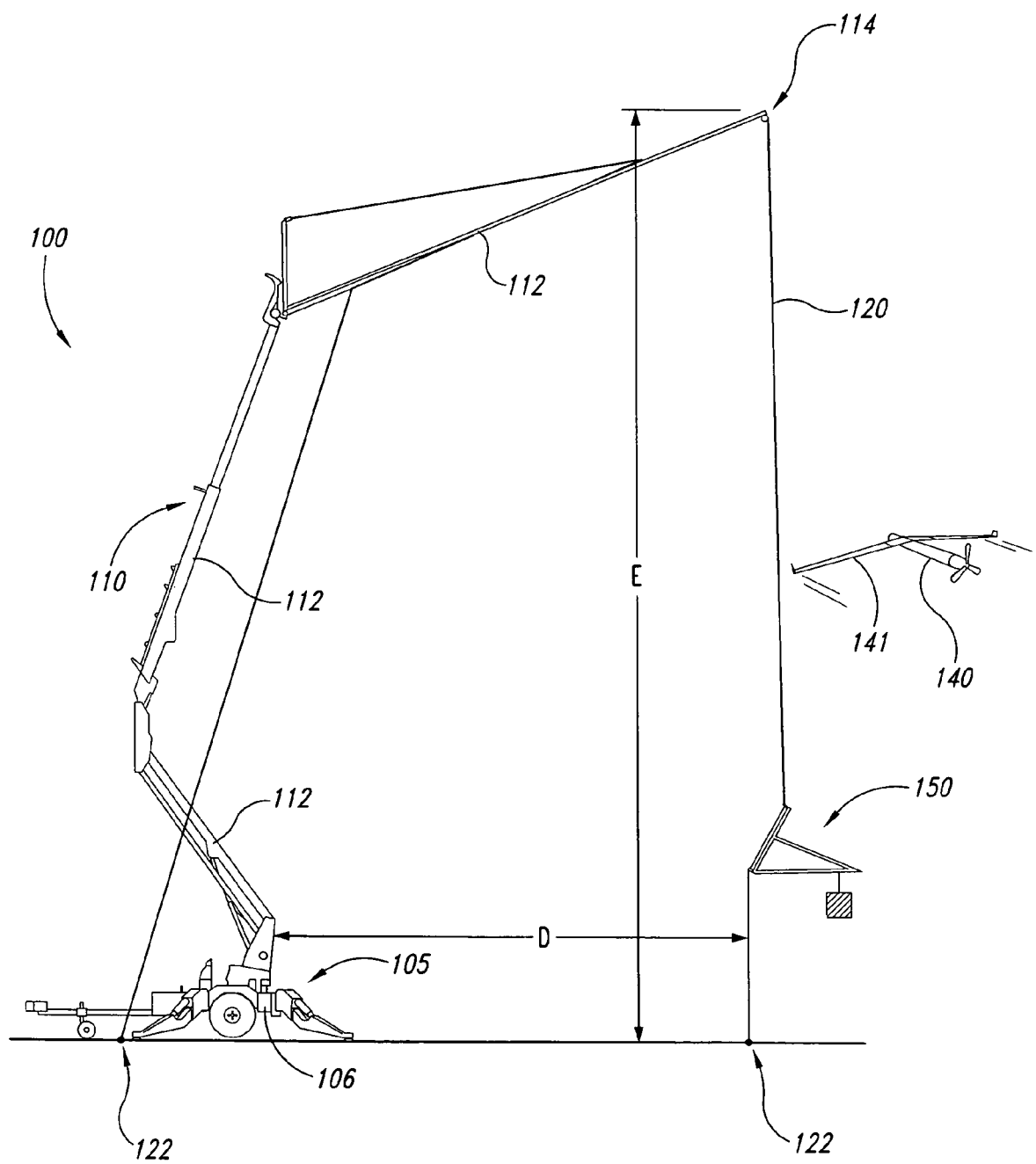
FIG. 1A is a partially schematic, isometric illustration of an apparatus configured to recover an unmanned aircraft and control post-recovery motion of the aircraft in accordance with an embodiment of the invention.

The present disclosure describes methods and apparatuses for indicating, measuring, and/or adjusting tension in pliant tension members, such as aircraft recovery lines. A tool for indicating tension in a pliant tension member in accordance with one embodiment of the invention, for example, can include a first support member releasably coupled to a flexible line suspended from a support structure. The first support member is positioned generally parallel to the flexible line. The tool can also include a second support member coupled to the first support member and positioned at an acute angle relative to the first support member. The second support member has a center of gravity at a selected distance from the flexible line. The second support member is generally horizontal when the tension in the flexible line is at a desired value. In several embodiments, the tool can further include a weight carried by the second support member, with the combination of the weight and the second support member defining the center of gravity.

Another aspect is directed toward an aircraft handling system. The system can include a support structure and a flexible recovery line suspended from the support structure. The recovery line is suspended in a generally downward direction and has an intercept portion positioned to intercept an unmanned aircraft in flight. The system can also include a tension measurement apparatus releasably carried by the recovery line and positioned to measure the tension in the recovery line. The tension measurement apparatus includes a first generally rigid bar and a second generally rigid bar coupled to the first bar. The first bar is releasably coupled to the recovery line and positioned generally parallel to the recovery line. The second bar is positioned at an angle less than 90 degrees relative to the first bar. The second bar has a center of gravity at a selected distance from the recovery line. The second bar is generally horizontal when the tension in the recovery line is at a desired value.

Still another aspect is directed toward a method for measuring tension in a pliant tension member. The method can include releasably coupling a first support member of a tension indication tool to a flexible line suspended from a support structure. The first support member is positioned generally parallel to the flexible line. The tool also includes a second support member coupled to the first support member and positioned at an acute angle relative to the first support member. The second support member has a center of gravity at a selected distance from the flexible line. The method can further include adjusting the tension in the flexible line until the second support member is generally horizontal.

Many specific details of certain embodiments of the invention are set forth in the following description and in FIGS. 1A-4 to provide a thorough understanding of these embodiments. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

B. Embodiments of Methods and Apparatuses for Indicating, Measuring, and/or Adjusting Tension in Aircraft Recovery Lines FIG. 1A is a partially schematic, isometric illustration of an aircraft handling system 100 configured to capture an unmanned aircraft 140 and control post-recovery motion of the aircraft 140 in accordance with an embodiment of the invention. The aircraft handling system 100 can include a support platform 105, a support structure or boom 110 carried by the support platform 105, and a flexible recovery line 120 extended by gravity or other forces from the boom 110. A tension measurement and indication tool 150 is removably attached to the recovery line 120 before capturing the aircraft 140 and configured to precisely indicate and/or measure the tension in the recovery line 120. If necessary, the tension in the recovery line 120 can be adjusted. The tension measurement tool 150 is generally removed from the recovery line 120 before capturing the aircraft 140. Further details regarding the tension measurement tool 150 and methods for using the tool are described below with reference to FIGS. 2A-2C.

The support platform 105 includes a trailer 106 configured to be moved by a truck or other suitable land vehicle. In other embodiments, the support platform 105 can include other structures, such as a boat or other water vessel, a truck or other land vehicle, or a building. In the illustrated embodiment, the boom 110 is a knuckle or articulating boom having a plurality of segments 112 configured to move relative to each other to position a distal portion 114 of the boom 110 at a desired location. In other embodiments, however, the boom 110 can have other arrangements, such as a telescoping arrangement, a scissors arrangement, and/or a parallel linkage arrangement. The recovery line 120 can include, for example, a polyester rope or another suitable type of rope or cable configured to releasably capture and support the aircraft 140.

In one aspect of this embodiment, the distal portion 114 of the boom 110 can be positioned at an elevation E above the local surface (e.g., the ground shown in FIG. 1A) and a distance D away from the nearest vertical structure projecting from the local surface. The elevation E and distance D can vary based upon the configuration of the boom 110, the configuration of the aircraft 140, and the local environment. The boom 110 can be configured to carry both a vertical load and a lateral load via the recovery line 120. In any of the foregoing embodiments, the aircraft 140 is captured when it flies into the recovery line 120. Once captured, the aircraft 140 is suspended from the recovery line 120 by one of its wings 141.

Figure 1B:
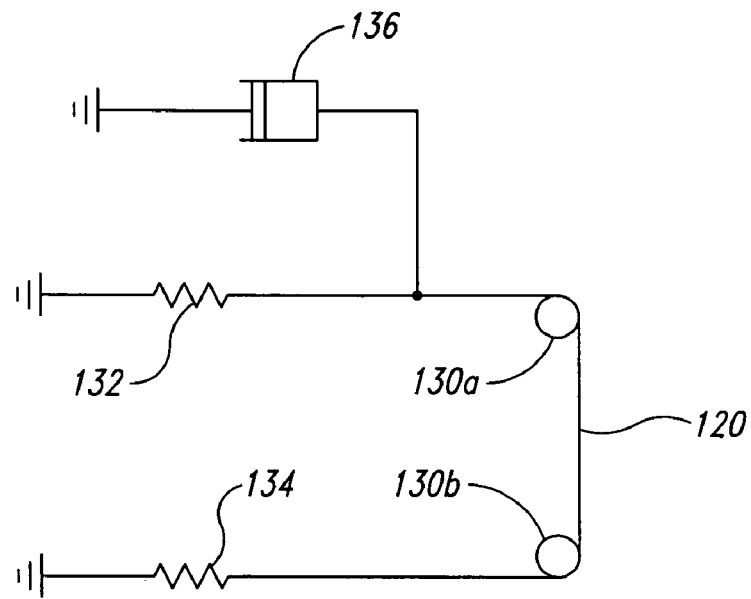
FIGS. 1B and 1C are schematic illustrations of portions of recovery systems configured to provide tension in a recovery line in accordance with several embodiments of the invention.
Figure 1C:
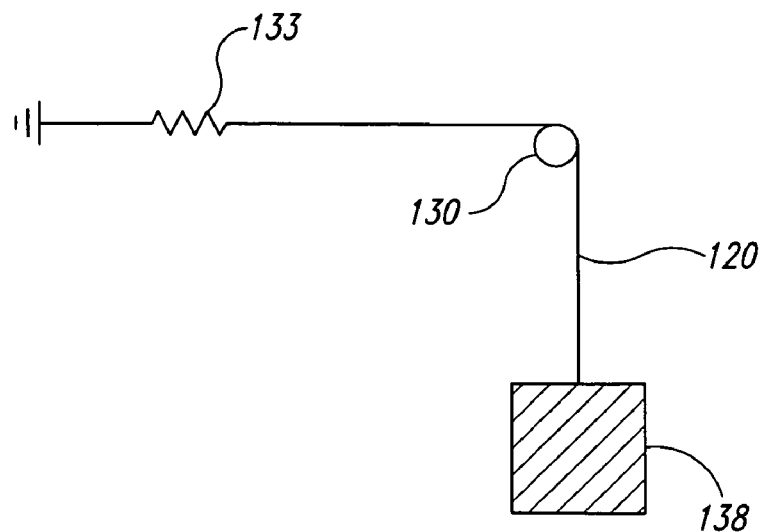

The recovery line 120 carried by the boom 110 can be operably coupled to one or more attachment points 122 (shown schematically) on the ground to provide tension in the recovery line 120. FIGS. 1B and 1C, for example, are schematic illustrations of arrangements for providing tension in the recovery line 120 before, during, and after aircraft capture in accordance with several embodiments of the invention. Referring first to FIG. 1B, the recovery line 120 can pass over a series of pulleys 130, shown as a first pulley 130*a* (e.g., on the boom 110 of FIG. 1A) and a second pulley 130*b* (e.g., at the attachment point 122 of FIG. 1A). The recovery line 120 can also be operably coupled to a first axially resilient member 132 and a second axially resilient member 134. The first and second axially resilient members 132 and 134 can provide tension in the recovery line 120 before the aircraft (not shown) intercepts the recovery line at a location between the first pulley 130*a* and the second pulley 130*b*. In one embodiment, the axially resilient members 132 and 134 can include a spring or other forcing mechanism (including a weight, a hydraulic or pneumatic actuator, or an electric motor) coupled to the recovery line 120. In another aspect of this embodiment, a damper 136 can be operatively coupled to the recovery line 120 in parallel or in series with at least one of the axially resilient members 132 and 134 to smooth out the action of the axially resilient members 132 and 134. In another embodiment, the axially resilient members 132 and 134 can be omitted and the recovery line 120 can be operatively coupled to only the damper 136. In this embodiment, the damper 136 provides only a drag force on the recovery line 120.

Referring next to FIG. 1C, in another embodiment, the recovery line 120 can be operatively coupled to a weight 138 or another suitable forcing mechanism and an axially resilient member 133 to provide tension in the line. In this embodiment, the recovery line 120 may not be coupled to one or more of the attachment points 122 (FIG. 1A). The axially resilient member 133 can include, for example, a constant force spring or another suitable type of spring or forcing member.

Figure 2A:
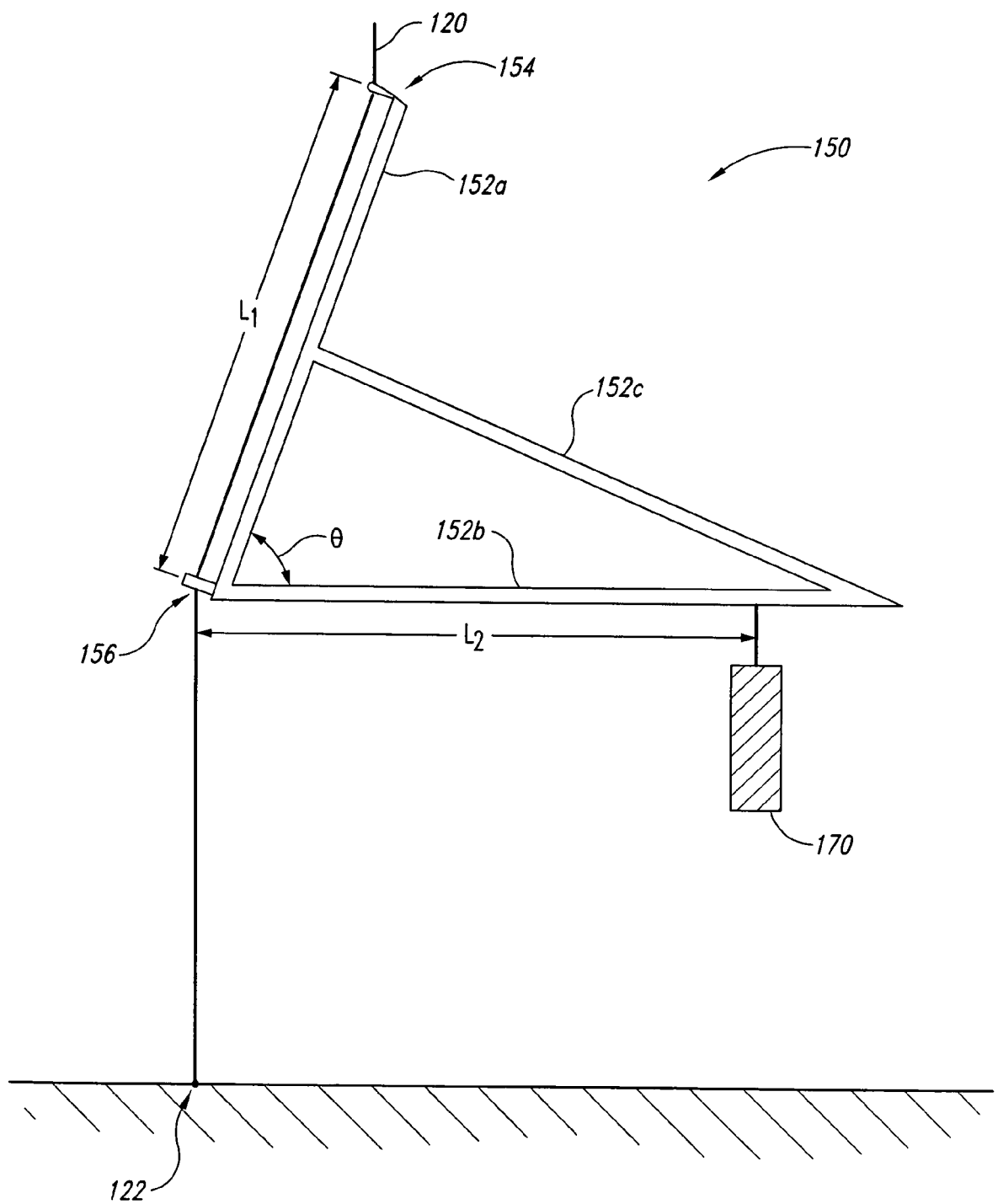
FIGS. 2A-2C are partially schematic, isometric illustrations of a tension measurement tool configured in accordance with an embodiment of the invention.

FIG. 2A is a partially schematic, isometric illustration of the tension measurement tool 150 operably coupled to the recovery line 120 to measure the tension in the recovery line 120 before capturing the aircraft 140 (FIG. 1A). The tension measurement tool 150 can include a first portion or bar 152*a* and a second portion or bar 152*b* coupled to the first portion 152*a* and positioned at an angle θ relative to the first portion 152*a*. The tension measurement tool 150 further includes a third portion or bar 152*c* coupled to the first portion 152*a* and the second portion 152*b*. The third portion 152*c* projects from the first portion 152*a* in a direction approximately normal to the first portion 152*a* and intersects the second portion 152*b*. The third portion 152*c* is an optional component that may not be included in some embodiments. The first, second, and third portions 152*a-c* accordingly define a triangular configuration generally similar to an A-frame geometry. The portions 152*a-c* are generally rigid support members configured to withstand the forces applied to the tool 150 during operation. In the illustrated embodiment, for example, each of the portions 152*a-c* is composed of a metal or composite material. In other embodiments, however, the portions 152*a-c* can be composed of other suitable materials. The tension measurement tool 150 further includes a weight 170 attached to the second portion 152*b*. As described in greater detail below, the weight 170 is generally a known, preselected weight based, at least in part, on the desired tension in the recovery line 120.

Figure 2B:
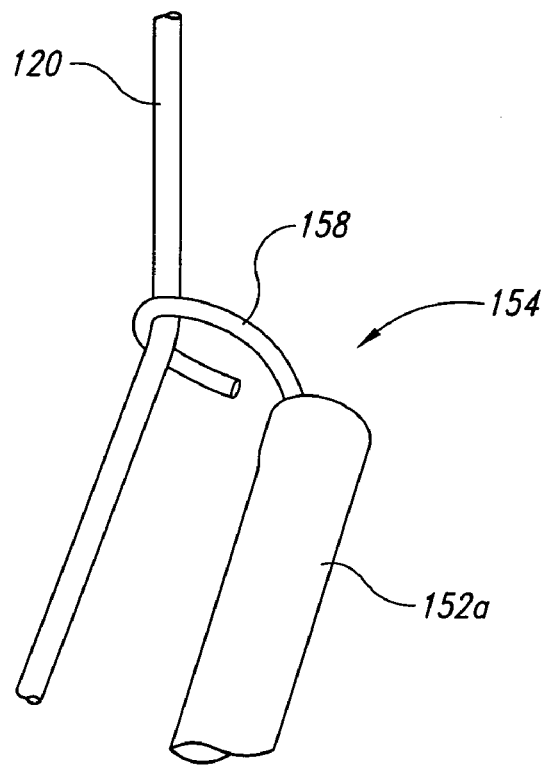
Figure 2C:
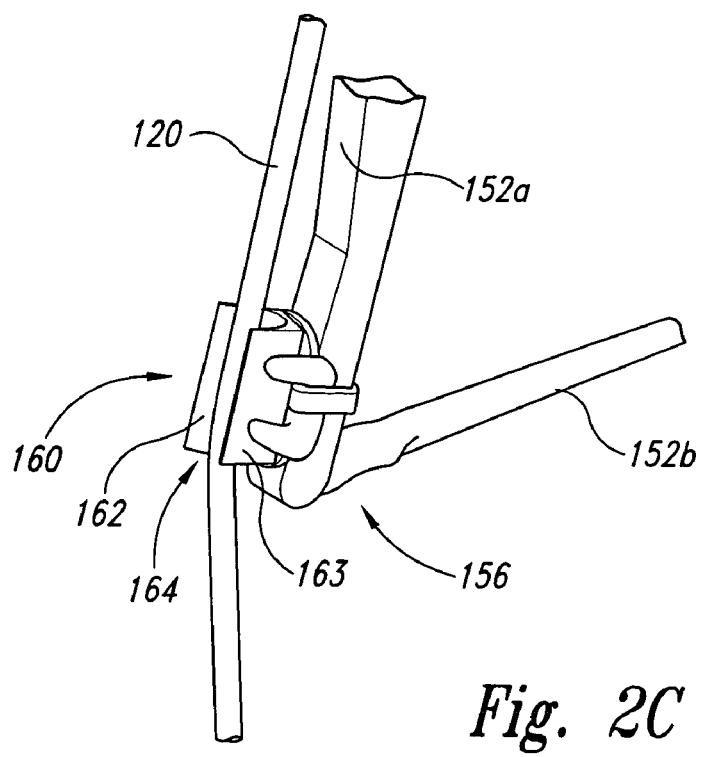

The tension measurement tool 150 further includes a first contact or engagement member 154 in contact with a first portion of the recovery line 120 and a second contact or engagement member 156 in contact with a second, lower portion of the recovery line 120. FIG. 2B is an enlarged isometric view of the first contact member 154, and FIG. 2C is an enlarged isometric view of the second contact member 156. Referring to FIG. 2B, the first contact member 154 can include an open-ended loop or "C-shaped" portion 158 positioned around the recovery line 120 and configured to hold the tension measurement tool 150 in place with respect to the recovery line 120, while allowing the recovery line 120 to pass through the loop without restriction. Referring to FIG. 2C, the second contact member 156 can include a line engagement member 160 having a first portion 162 and a second portion 163 arranged to define a generally U-shaped channel 164. The channel 164 is configured to receive a portion of the recovery line 120 when the tension measurement tool 150 is positioned on the recovery line 120. In one aspect of this embodiment, the channel 164 can include a non-slip surface configured to hold the tension measurement tool 150 in place relative to the recovery line 120 and prevent the tool from slipping or otherwise moving during operation. In other embodiments, the first contact member 154 and/or the second contact member 156 can include different features and/or have different arrangements.

Referring back to FIG. 2A, the tension $T_0$ in the recovery line 120 can be measured by the tension measurement tool 150 using the following formula:

$$T_0 = W\left(\frac{L_2}{L_1\cos(\theta)} - \frac{1}{2}\right)$$

where $L_1$ is the distance between the first contact member 154 and the second contact member 156, $L_2$ is the distance between the weight 170 and the recovery line, W is the value of the weight 170 suspended from the second portion 152b, and, as discussed previously, θ is the angle between the first portion 152a and the second portion 152b. The respective values can have any type of unit, so long as the units are consistent (e.g., $L_1$ and $L_2$ have consistent units of length, $T_0$ and W have consistent units of force).

The tension measurement tool 150 can be used to measure the tension in the recovery line 120 in several different ways. For example, if the recovery line 120 has previously been set at a desired tension, the tension measurement tool 150 can be used to confirm the tension value. In operation, the tension measurement tool 150 is attached to the recovery line 120 and a weight 170 having a known value is positioned at a known distance $L_2$ from the recovery line 120. The value of the weight 170 and the distance $L_2$ can be derived using the above formula. If the recovery line 120 is set at the correct tension, the second portion 152b of the attached tension measurement tool 150 will be generally horizontal (as shown in FIG. 2A). If the second portion 152b is not horizontal, however, the tension in the recovery line 120 is not at the desired value. More particularly, if the second portion 152b is tilting upward (as viewed from left to right), the tension is too high. On the other hand, if the second portion 152b is tilting downward (as viewed from left to right), the tension is too low. Referring back to FIG. 1A, the tension in the recovery line 120 can be adjusted (either increased or decreased) by adjusting the position of one or more of the attachment points 122 and/or increasing/decreasing the angle of the boom 110. In other embodiments, the tension can be adjusted using other suitable methods and/or techniques. When the tension has been adjusted to a desired level such that the second portion 152b is generally horizontal, the tension measurement tool 150 can be removed from the recovery line 120.

Alternatively, the tension measurement tool 150 can be attached to the recovery line 120 and the weight 170 can be slid or otherwise moved along the second portion 152b to adjust the lateral position of the weight 170 relative to the recovery line 120 to one or more predetermined positions corresponding to specific tension values. The recovery line 120 can be set to the desired value by adjusting the tension (either increasing or decreasing) in the line until the second portion 152b is generally horizontal. One advantage of this arrangement is that the tension measurement tool 150 can be configured to indicate a number of different tension values in the recovery line 120 with only minor adjustments to the tool 150 (e.g., moving the weight 170 along the second portion 152b).

In several embodiments, a scale can be used in conjunction with the tension measurement tool 150 to measure the tension in the recovery line 120. For example, the tension in the recovery line 120 can be measured by attaching a scale to a portion of the recovery line (e.g., proximate to one of the attachment points 122 of FIG. 1A) and reading the tension measured by the scale after removing the tool 150 from the recovery line.

One advantage of embodiments of the tension measurement tool 150 described above is it can be used to quickly and accurately measure the tension in the recovery line 120 during operation. For example, an operator merely has to attach the tension measurement tool 150 to the recovery line 120 and determine whether the second portion 152b of the tool is horizontal to measure the tension in the recovery line 120. The tension measurement tool 150 can be quickly installed on the recovery line 120 without the use of any specialized hardware and/or equipment. This feature is expected to significantly reduce the time and expense associated with measuring the tension in the recovery line 120.

Another feature of embodiments of the tension measurement tool 150 is that it can provide consistent results between different operators and different installations. In contrast with conventional tension measurement methods that rely on user-dependent and/or arbitrary techniques, the fixed geometry of the tension measurement tool 150 is expected to provide user-independent and consistent tension information for the recovery line 120.

Still another feature of embodiments of the tension measurement tool 150 is that the tool itself can have a robust, rugged design suitable for use in a variety of different operational conditions. Many conventional scales or measurement devices include delicate and/or sensitive components that can be easily damaged or broken, making such devices impracticable for use in many operational environments. In contrast with such devices, however, the tension measurement tool 150 can be a rugged device including generally rigid bars composed of metal, composites, or other suitable materials. One advantage of this feature is that the tension measurement tool 150 can be used in a variety of different environments and/or operational conditions without damaging or otherwise compromising the accuracy of the tool.

Figure 3:
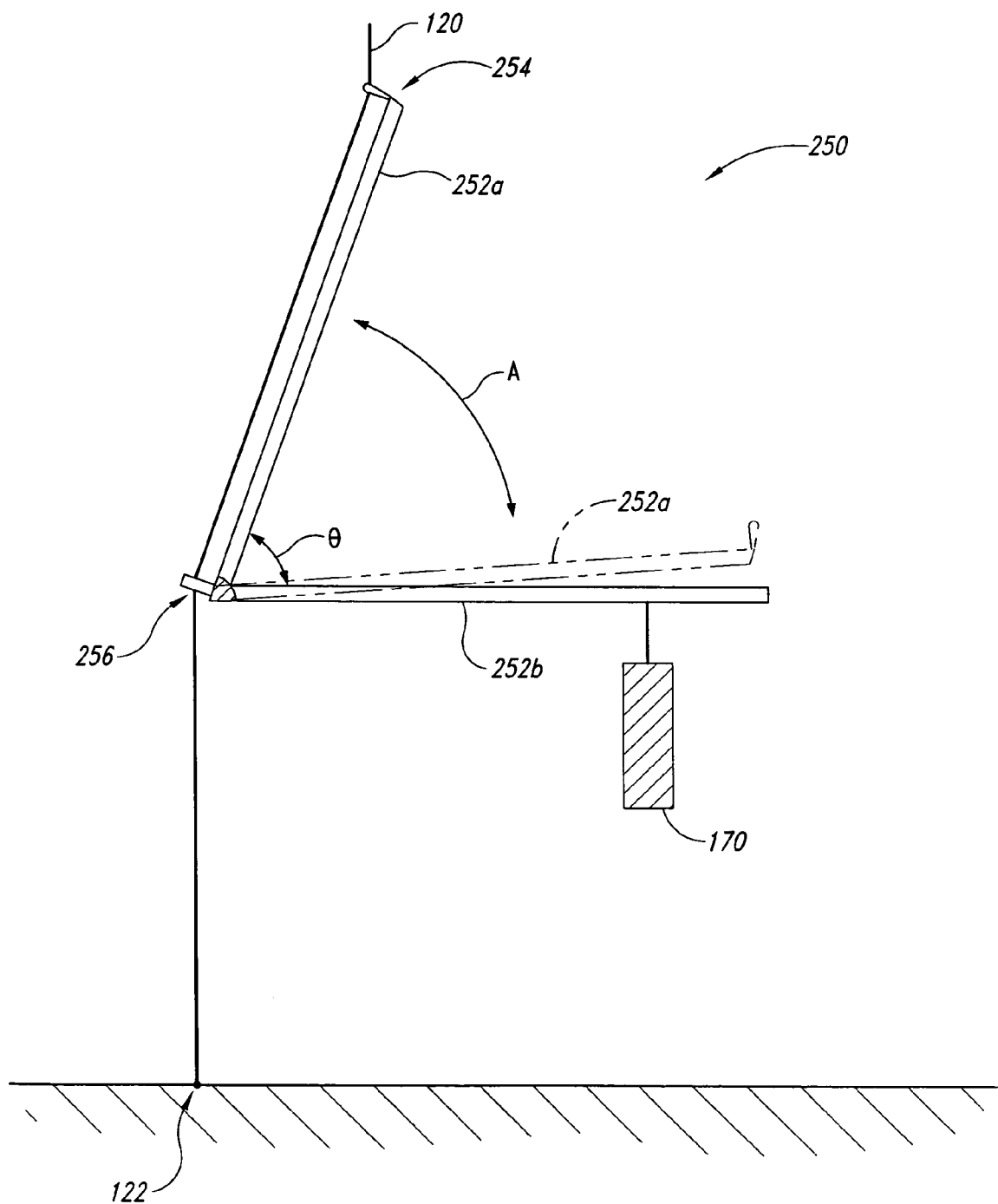
FIG. 3 is a partially schematic, isometric illustration of a tension measurement tool configured in accordance with another embodiment of the invention.

FIG. 3 is a partially schematic, isometric illustration of a tension measurement tool 250 configured in accordance with another embodiment of the invention. The tension measurement tool 250 is operably coupled to the recovery line 120 and positioned to measure and/or indicate the tension in the line. The tension measurement tool 250 can measure and/or indicate the tension in the recovery line 120 using methods generally similar to those discussed above.

The tension measurement tool 250 includes a first portion or bar 252a and a second portion or bar 252b coupled to the first portion 252a. The tension measurement tool 250 differs from the tension measurement tool 150 described above in that the first and second portions 252a and 252b of the tool 250 are movable relative to each other rather than being fixed. For example, the first portion 252a can pivotably move (as shown by the arrow A) relative to the second portion 252b between a stowed or non-operational position (shown in broken lines) and a deployed or operational position (shown in solid lines). In the operational position, the first portion 252a is spaced apart from the second portion 252b by the angle θ. One advantage of this arrangement is that the tension measurement tool 250 can be easily stowed when not in use and requires minimal room for storage.

The tension measurement tool 250 also includes a first contact member 254 and a second contact member 256 configured to engage the recovery line 120 and releasably attach the tension measurement tool 250 to the recovery line 120. The first and second contact members 254 and 256 can include features generally similar to the features of the first and second contact members 154 and 156 described above with reference to FIGS. 2B and 2C. In other embodiments, the tension measurement tool 250 can have other arrangements and/or include other features. For example, the tension measurement tool 250 can include more than two portions or bars 252 and/or the first and second portions 252a and 252b can have a different arrangement relative to each other in the stowed position.

Figure 4:
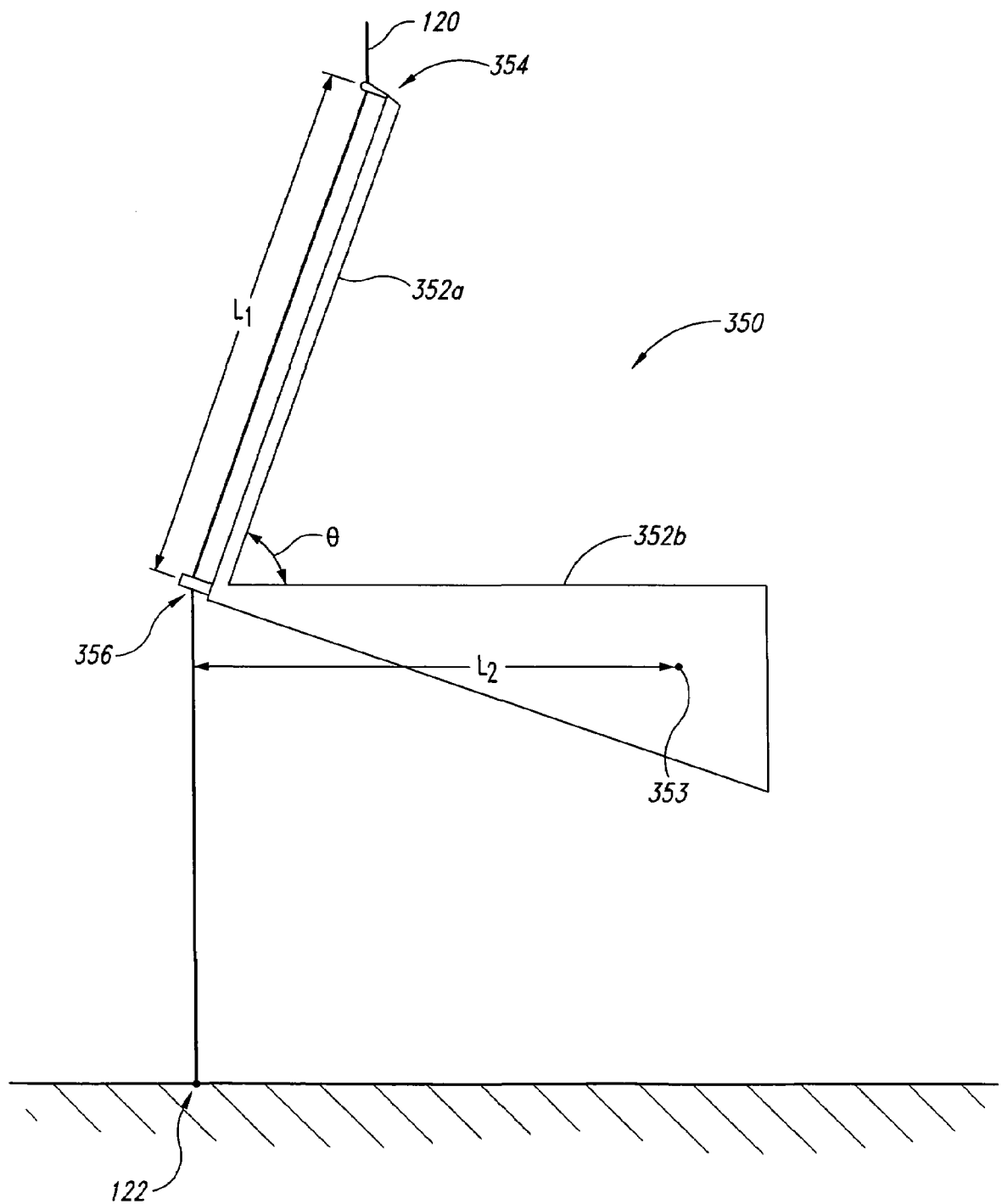
FIG. 4 is a partially schematic, isometric illustration of a tension measurement tool configured in accordance with still another embodiment of the invention.

FIG. 4 is a partially schematic, isometric illustration of a tension measurement tool 350 configured in accordance with still another embodiment of the invention. The tension measurement tool 350 is operably coupled to the recovery line 120 and positioned to measure and/or indicate the tension in the line using methods generally similar to those discussed above.

The tension measurement tool 350 includes a first portion or bar 352a and a second portion or bar 352b coupled to the first portion 352a. The tension measurement tool 350 differs from the tools 150 and 250 described above with reference to FIGS. 1A-3 in that the second portion 352b of the tool 350 is much larger than the second portions 152b and 252b of the tools 150 and 250, respectively. Thus, a separate weight (e.g., the weight 170) does not need to be attached to the tool 350 during operation. Instead, the second portion 352a has a known, preselected weight and a center of gravity 353 spaced apart from the recovery line 120 by a distance $L_2$. The tension measurement tool 350 can accordingly be preconfigured to indicate a desired tension in the recovery line 120. One advantage of this arrangement is that one or more separate weights are not required for operation. In addition, this configuration further mitigates the problems associated with user error when measuring tension in the recovery line 120 because a user (not shown) does not have to position a weight at a specific distance from the recovery line 120 and/or measure the distance between the weight and the recovery line 120.

The tension measurement tool 350 also includes a first contact member 354 and a second contact member 356 configured to releasably couple the tension measurement tool 350 to the recovery line 120. The first and second contact members 354 and 356 can include features generally similar to the features of the first and second contact members 154 and 156 described above with reference to FIGS. 2B and 2C. In other embodiments, the tension measurement tool 350 can have other arrangements and/or include other features. For example, in one embodiment the first and second portions 352a and 352b of the tension measurement tool 350 can be pivotably movable relative to each other between a stowed position and an operational position.

From the foregoing, it will be appreciated that specific embodiments of the invention have been described herein for purposes of illustration, but that various modifications may be made without deviating from the invention. For example, the first and second portions 252a and 252b of the tension measurement tool 250 described above can be completely separate components that are installed together in the desired arrangement during operation and uninstalled for storage. Aspects of the invention described in the context of particular embodiments may be combined or eliminated in other embodiments. For example, the tension measurement tools 150/250/350 can be used to indicate the tension in any pliant tension member (e.g., flexible ropes or lines, guy wires, etc.) and are not limited to applications that include aircraft recovery lines. In addition, the tension measurement tools 150/250/350 can be used to indicate the tension in non-vertical pliant tension members by adding one or more spacer devices that match the angle of the pliant tension member relative to the vertical. Further, aspects of the invention described in the context of an unmanned aircraft system can be implemented in other systems and/or can be implemented for use with vehicles or devices other than aircraft. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A tool for indicating tension in a flexible line, the tool comprising:

a first support member releasable coupled to the flexible line suspended from a support structure, the first support member being positioned generally parallel to the flexible line, wherein the first support member comprises an elongated bar having a first contact member releasably coupled to a first portion of the flexible line and a second contact member releasably coupled to a second portion of the flexible line below the first portion of the flexible line; and a second support member integral with the first support member and fixed at an acute angle relative to the first support member, the second support member having a center of gravity at a selected distance from the flexible line, wherein the second support member is generally horizontal when the tension in the flexible line is at a desired value.

2. The tool of claim 1 wherein:

the first contact member includes an open-ended loop positioned to receive the first portion of the flexible line; and the second contact member includes a line engagement member having a generally U-shaped channel positioned to receive the second portion of the flexible line.

3. The tool of claim 2, further comprising a non-slip material in at least a portion of the channel and positioned to engage the second portion of the flexible line.

4. The tool of claim 1 wherein the center of gravity is a first center of gravity, and the tool further comprises a weight having a known value releasably carried by the second support member, wherein the combination of the weight and the second support member have a second center of gravity at a selected distance from the flexible line.

5. The tool of claim 1 wherein:

the first contact member is spaced apart from the second contact member by a distance $L_1$;

the second support member has a weight W and the center of gravity of the weight W is spaced apart from the flexible line by a distance $L_2$ when the second support member is generally horizontal;

the second support member is positioned at an angle θ from the first support member; and for a given tension value $T_0$, the dimensions relate as follows $$T_0 = W\left(\frac{L_2}{L_1\cos(\theta)} - \frac{1}{2}\right).$$

6. The tool of claim 1 wherein the first and second support members are generally rigid support members composed of metal or composite materials.

7. The tool of claim 1 further comprising a third support member coupled to and extending between the first support member and the second support member.

8. An aircraft handling system, comprising:
   a support structure;
   a flexible recovery line suspended from the support structure in a generally downward direction and having an intercept portion positioned to intercept an unmanned aircraft in flight; and
   a tension indicating apparatus releasably carried by the recovery line and positioned to indicate the tension in the recovery line, the tension indication apparatus including—
      a first generally rigid bar releasably coupled to the recovery line and positioned generally parallel to the recovery line, wherein the first bar includes a first attachment device releasable coupled to a first portion of the recovery line and a second attachment device releasable coupled to a second portion of the recovery line below the first portion of the recovery line; and
      a second generally rigid bar integral with the first bar and fixed at an acute angle relative to the first bar, the second bar having a center of gravity at a selected distance from the recovery line, wherein the second bar is generally horizontal when the tension in the recovery line is at a desired value.

9. The system of claim 8 wherein the support structure includes a first portion and a second portion, and wherein at least one of the first and second portions is movable relative to the other.

10. The system of claim 8 wherein the support structure is configured to carry both a lateral load and a vertical load via the recovery line.

11. The system of claim 8, further comprising one or more axially extendable members coupled to the recovery line and positioned to extend when tension is applied to the recovery line.

12. The system of claim 8 wherein the center of gravity is a first center of gravity, and wherein the system further comprises a weight having a known value releasably carried by the second bar, wherein the combination of the weight and the second bar have a second center of gravity at a selected distance from the recovery line.

13. The system of claim 8 wherein the tension indicating apparatus further comprises a third bar coupled to and extending between the first bar and the second bar.

14. The system of claim 8, further comprising the aircraft, and wherein the aircraft includes a lifting surface and a capture device mounted to the lifting surface and configured to releasably secure the aircraft to the recovery line when the aircraft intercepts the recovery line.

15. The system of claim 8 wherein:
   the first attachment device includes a C-shaped loop positioned to receive the first portion of the recovery line; and
   the second attachment device includes a generally U-shaped channel positioned to receive the second portion of the recovery line.

16. A tool for indicating tension in a flexible recovery line suspended in a generally downward direction from an extendable boom, the recovery line having an intercept portion positioned to intercept an unmanned aircraft in flight, the tool comprising:
   a first generally rigid portion integral with a second generally rigid portion, wherein the second portion is fixed at an acute angle relative to the first portion, and wherein the first and second portions comprise elongated bars;
   a first engagement member and a second engagement member carried by the elongated bar of the first portion, the first engagement member being releasably coupled to a first portion of the recovery line and the second engagement member being releasably coupled to a second portion of the recovery line, wherein the second portion of the recovery line is lower than the first portion of the recovery line, and wherein the first portion is generally parallel with the recovery line after installation; and
   a weight having a known value carried by the second portion and spaced apart from the recovery line by a selected distance such that, when the tension in the recovery line is at a desired value, the second portion is generally horizontal.

17. The tool of claim 16, further comprising a third portion coupled to the first portion and the second portion and extending between the first portion and the second portion such that the tool has a generally triangular configuration.

18. A method for indicating tension in a flexible line, the method comprising:
   releasably attaching a first support member of a tension indication tool to a flexible line suspended in a generally downward direction from a support structure with the first support member positioned generally parallel to the flexible line, the first support member including an elongated bar having a first contact member releasably coupled to a first portion of the flexible line and a second contact member releasably coupled to a second portion of the flexible line below the first portion of the flexible line, and wherein the tool includes a second support member integral with the first support member and fixed at an acute angle relative to the first support member, the second support member having a center of gravity at a selected distance from the flexible line; and
   adjusting the tension in the flexible line until the second support member is generally horizontal.

19. The method of claim 18 wherein the first contact member includes an open-ended loop; and
   the second contact member includes a line engagement member having a generally U-shaped channel positioned to receive the second portion of the flexible line.

20. The method of claim 18 wherein the first support member and the second support member are composed of metal or composite materials.

21. The method of claim 18, further comprising applying tension to the flexible line before releasably attaching the first support member to the flexible line.

22. The method of claim 18 wherein adjusting the tension in the flexible line comprises at least one of (a) increasing the tension in the flexible line if the second support member is tilted generally downward after releasably attaching the tool to the flexible line, and (b) decreasing the tension in the flexible line if the second support member is tilted generally upward after releasably attaching the tool to the flexible line.

23. The method of claim 18 wherein the center of gravity is a first center of gravity, and wherein the method further comprises attaching a weight having a known value to the second support member before adjusting the tension, wherein the combination of the weight and the second support member have a second center of gravity at a selected distance from the flexible line.

24. The method of claim 18 wherein the first attachment device is spaced apart from the second attachment device by a distance $L_1$, the second support member is positioned at an angle $\theta$ from the first support member, and the center of gravity is a first center of gravity, and wherein the method further comprises:
   attaching a weight having a known value W to the second support member, wherein the weight and the second support member have a second center of gravity;
   adjusting a lateral position of the weight relative to the flexible line until the second support member is generally horizontal and the second center of gravity is a distance $L_2$ from the flexible line; and
   calculating the tension $T_0$ in the flexible line using the following equation—

$$T_0 = W\left(\frac{L_2}{L_1 \cos(\theta)} - \frac{1}{2}\right).$$

25. A method for handling an unmanned aircraft, comprising:
   deploying a flexible recovery line from an extendable boom, the recovery line being suspended from the boom in a generally downward direction and having an intercept portion positioned to intercept an unmanned aircraft in flight;
   applying tension to the recovery line;
   releasably attaching a first elongated bar of a tension indication tool to the recovery line with the first bar positioned generally parallel to the recovery line, the first bar including a first engagement member releasably coupled to a first portion of the recovery line and a second engagement member releasably coupled to a second portion of the recovery line below the first portion of the recovery line, and wherein the tool includes a second elongated bar integral with the first bar and fixed at an acute angle relative to the first bar, the second bar having a center of gravity at a selected distance from the recovery line; and
   adjusting the tension in the recovery line until the second bar is generally horizontal.

26. The method of claim 25, further comprising:
   releasably capturing the aircraft in flight with the recovery line after adjusting the tension in the recovery line; and
   retrieving the aircraft from the recovery line.

27. The method of claim 25, further comprising moving at least one of a first portion and a second portion of the boom relative to the other to place the boom in an extended position before deploying the flexible recovery line.

28. The method of claim 25 wherein:
   the first engagement member includes a C-shaped loop; and
   the second engagement member includes a generally U-shaped channel positioned to receive the second portion of the recovery line.

29. The method of claim 25 wherein adjusting the tension in the recovery line comprises:
   increasing the tension in the recovery line if the second bar is tilted generally downward after releasably attaching the first bar of the tool to the recovery line, and
   decreasing the tension in the recovery line if the second bar is tilted generally upward after releasably attaching the first bar of the tool to the recovery line.

30. The method of claim 25 wherein the center of gravity is a first center of gravity, and wherein the method further comprises:
   attaching a weight having a known value to the second bar before adjusting the tension in the recovery line, wherein the combination of the weight and the second bar defines a second center of gravity at a selected distance from the recovery line; and
   adjusting a lateral position of the weight relative to the recovery line to one or more predefined positions corresponding to particular tension values before adjusting the tension in the recovery line.

* * * * *